June 3, 1958     V. J. GOOLEY     2,836,897
GARDEN LINE MARKER
Filed Dec. 24, 1953
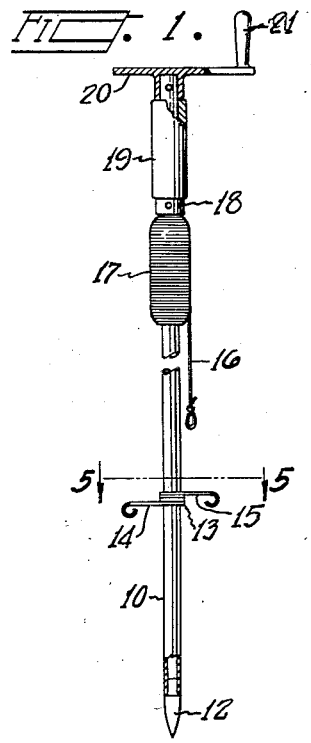
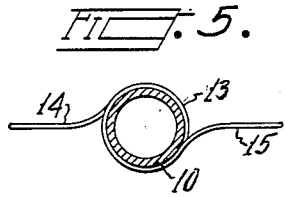
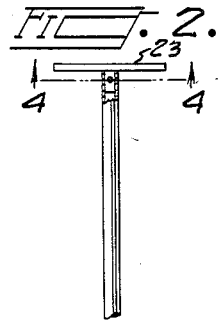
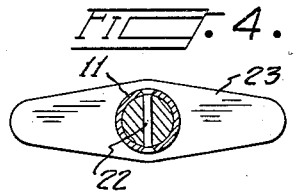
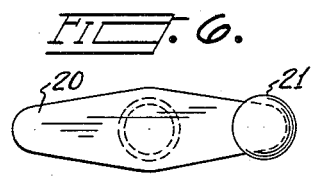
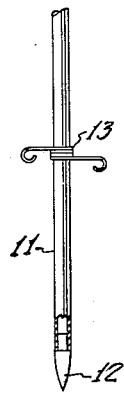
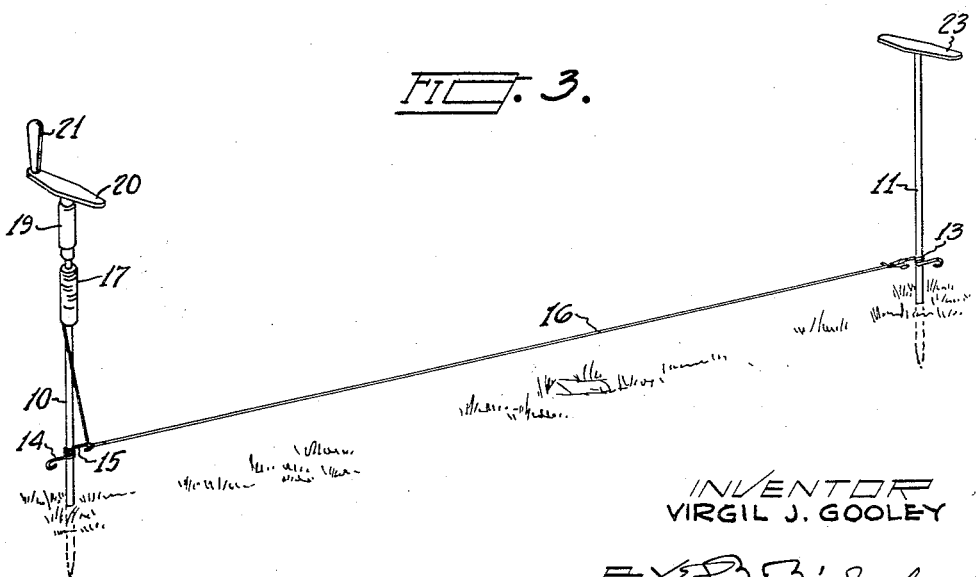
INVENTOR
VIRGIL J. GOOLEY
ATTORNEY

United States Patent Office 2,836,897
Patented June 3, 1958

2,836,897

GARDEN LINE MARKER

Virgil J. Gooley, Mount Angel, Oreg.

Application December 24, 1953, Serial No. 400,183

1 Claim. (Cl. 33—86)

This invention relates generally to garden tools and particularly to a Garden Line Marker.

The main object of this invention is to provide a convenient, inexpensive and efficient means for marking lines in gardens and for paying out the line and winding it up for storage purposes.

I accomplish this and other objects in the manner set forth in the following specification as illustrated in the accompanying drawing, in which Fig. 1 is a side elevation of the winding stake with a portion of the crank end broken away in section.

Fig. 2 is a side elevation of the holding stake with its upper end broken away in section.

Fig. 3 is a perspective view showing the device in use.

Fig. 4 is a section taken along the line 4—4 in Fig. 2.

Fig. 5 is a section taken along the line 5—5 in Fig. 1.

Fig. 6 is a plan of the winding stake.

Like numbers of reference refer to the same or similar parts throughout the several views.

Referring in detail to the drawing there is shown a winding stake 10 and a holding stake 11. The stakes 10 and 11 are made of light weight tubing and each has fixed in its ground engaging end a point 12. In some cases the tubing is merely flattened at the end and sharpened by cutting or folded over along each edge to form a point.

On each stake 10 and 11 is mounted a coil of spring wire 13 whose ends 14 and 15 form handles by means of which the coil may be enlarged and permitted to slide freely along the stakes 10 and 11. The handle ends are inturned to provide eyes through which the marking line 16 may be run, or to which it may be secured.

A spool 17 of line 16 is secured on the upper portion of the stake 10 against a fixed collar 18. Above the collar 18 is a sleeve 19 in which the stake 10 is free to revolve. On the end of the stake 10 is secured the T-shaped head 20, on one end of which is a handle 21 which is used to turn the head 20. The head 20 is normally fastened to the stake 10 by means of a rivet 22 as shown in Figure 4 in the case of head 23 on stake 11.

The holding stake 11 is similar to the stake 10 except that it has no spool 17 or sleeve 19 and the head 23 has no turning handle as does the head 20.

The operation of the device is as follows: The stake 11 is first forced into the ground at one end of the row about to be planted and the coil 13 is raised to the desired height of line. The line 16 is then attached to the end 15 of the coil 13 of the stake 11 and the gardener walks towards the opposite end of the row while grasping sleeve 19 and holding the stake 10 normal to the line 16. This allows the stake 10 to turn in the sleeve 19 and if he wants to retard the unwinding action, he simply grasps the tubular stake 10 in his hand. He then sets the winding stake 10 firmly at the end of the row and leads the line 16 through the eye on the member 15, which he has raised to the desired height after the stake is set.

The line can be tightened by using the earth as a bearing, in which case the coil 13 on the stake 10 merely remains stationary while the stake 10 turns.

In winding up the line it is only necessary to free it from the member 15, withdraw the stake 10 from the ground and rotate the stake in the sleeve 19 by means of the handle 21.

I claim:

A garden line maker comprising first and second stakes having shaft portions with pointed bottom ends, head members on said shaft portions for driving the stakes into the ground, a concentric hand grip sleeve on the shaft of said first stake, a handle on the head member of said first stake for turning said stake in said sleeve, a spool of line concentrically mounted on said first stake, and line guides frictionally engaged on each of said stakes for relative rotative and sliding movement, each of said guides comprising a coil spring surrounding and gripping the stakes and having looped ends projecting tangentially for guiding said line and for loosening said grip.

References Cited in the file of this patent

UNITED STATES PATENTS

| | | |
|---|---|---|
| 408,339 | Dobbs | Aug. 6, 1889 |
| 603,157 | Spitzenberg | Apr. 26, 1898 |
| 854,916 | Stoner | May 28, 1907 |
| 909,846 | Cavileer | Jan. 12, 1909 |
| 1,871,483 | Uitendaal | Aug. 16, 1932 |
| 1,933,163 | Coplen | Oct. 31, 1933 |
| 2,236,305 | Ahlin | Mar. 25, 1941 |
| 2,284,375 | DeBoard | May 26, 1942 |
| 2,522,223 | Hardin | Sept. 12, 1950 |
| 2,627,276 | Eggleton | Feb. 3, 1953 |